Oct. 17, 1939.   J. L. CREVELING   2,176,295
LUBRICATING DEVICE
Filed Oct. 8, 1935

INVENTOR:
John L. Creveling

Patented Oct. 17, 1939

2,176,295

UNITED STATES PATENT OFFICE 2,176,295

LUBRICATING DEVICE

John L. Creveling, near Tucson, Ariz., assignor to The Lubrication Corporation, Chicago, Ill., a corporation of Delaware Application October 8, 1935, Serial No. 44,043

2 Claims. (Cl. 285—96.3)

This invention relates to lubricating devices and, more particularly, to angularly adjustable discharge nozzles for pressure lubricating equipment.

The fittings or nipples commonly used for the lubrication of bearings on automobiles or other machinery are usually secured to the bearings or to other parts of the automobiles or machines to become relatively permanent parts thereof, and are often so located or so constructed and arranged that it is difficult, if not impossible, properly to service them with the usual lubricant equipment. The position of the fitting on the machine, and its relation to other parts of the machine which may partially obstruct access to the fitting, may make it practically impossible to approach and engage the fitting with a usual lubricant servicing gun nozzle in such a manner as to form a tight connection between the nozzle and fitting. The difficulty, on occasion, may be somewhat alleviated by the use of an angle adapter on the fitting or on the nozzle or the lubricant gun or hose, but such expedients lead to considerable expense since a separate adapter may have to be provided for each different angle desired or for each fitting. Where such angle adapters are used with the nozzle or lubricant gun or hose, frequent changes of adapters may be necessary, resulting in a considerable waste of time and effort in addition to the expense incident to providing a number of adapters.

The condition of lack of accessibility is most pronounced, perhaps, when the servicing operation is to be performed with a so-called push-gun, of a type such as that disclosed in Creveling Patent No. 1,960,527 or Zerk Patent No. 1,475,980, with either of which a thrust on the gun in the direction of the fitting not only forces lubricant into the fitting but also maintains a tight seal between the nozzle and the fitting during the time lubricant is being forced into the fitting. If the lubricant gun is equipped with a mere contact nozzle and the fitting is of the type disclosed in said Zerk patent, the thrust of the gun to effect and to maintain a seal between the fitting and nozzle must generally be along the axis of the receiving end of the fitting or within a small angle of departure therefrom. In such case, accessibility of the fitting for servicing is an important factor. Accessibility is also a very important factor with hydraulically or mechanically operated couplers or clamp nozzles, for the physical dimensions of such couplers require a greater amount of space for engagement with and disengagement from the "clamp-on" type fittings with which the couplers are used.

It will be apparent that an ordinary swivel would be wholly unsuited for use with a push-type gun since each thrust on the gun would cause undesired swiveling and it would be impossible to keep the nozzle properly aligned with the fitting. In using a flexible hose connected to a source of supply of lubricant under pressure, it is frequently desired to bend the hose through a greater angle than is possible in order to reach a relatively inaccessible fitting. It therefore becomes necessary to use angle adapters which are expensive and inconvenient, or free swivels which are difficult to handle, particularly in small spaces, between the end of the hose and the nozzle in order to obtain access to the fittings.

Accordingly, one of the objects of the invention is to provide a discharge nozzle which overcomes these difficulties.

It is another object of the invention to provide an angularly adjustable nozzle for use with any lubricant supply source and one which can be adjusted to different angular positions and successfully used to service relatively inaccessible fittings regardless of obstructions.

Another object is to provide an angularly adjustable nozzle which can be selectively locked in any of a plurality of angular positions.

Another object is to provide a lubricating device including a push type lubricant dispenser and an angularly adjustable nozzle in which the nozzle can be selectively locked in any desired angular position.

One type of nozzle with which the above and other objects may be carried out may comprise a rigid conduit member and a rigid clamp-type nozzle member connected by a swivel joint, the swivel joint preferably being arranged with its axis at an angle to the conduit axis, the nozzle including a locking means for locking the nozzle and conduit members against relative angular movement about the swivel axis. The locking means may take the form of a plurality of locking teeth carried by the nozzle member and a manually operated pawl carried by the conduit member for engagement with the locking teeth.

Further objects, advantages, and particular features, of the invention will appear from the following description when taken in connection with the accompanying drawing, in which.

Figure 1:
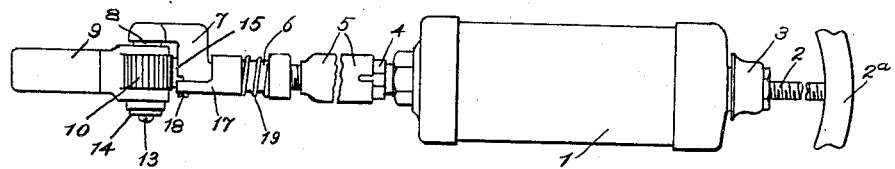
Fig. 1 is an elevation of a push-type complete lubricant gun including a nozzle embodying the invention.

Referring particularly to Fig. 1, a cylindrical barrel or container 1, which may serve as a reservoir for bulk lubricant or which may form a housing for interchangeable lubricant cartridges, is equipped with a feed screw 2 which extends into one end of the container through a quick release device 3. The release device 3 may be engaged with the feed screw so that the latter may be screwed into the container or it may be released from the feed screw to permit free axial movement of the feed screw. At the opposite end of the container, and coaxial therewith, is mounted a high pressure pump including relatively telescoping parts 4 and 5, the part 4 being secured to the container and the part 5 telescoping thereon and carrying the discharge nozzle to be described hereinafter.

The parts thus far described constitute a grease gun of a well-known type that may be purchased on the open market. This gun is operated by turning the feed screw 2 by the handle 2a to force lubricant from the container 1 into the high pressure pump, applying the nozzle to a fitting, and then exerting thrust against the container in the direction of the nozzle to telescope the pump parts into the relative positions indicated in the drawing, thereby to force lubricant from the nozzle into the fitting.

Figure 2:
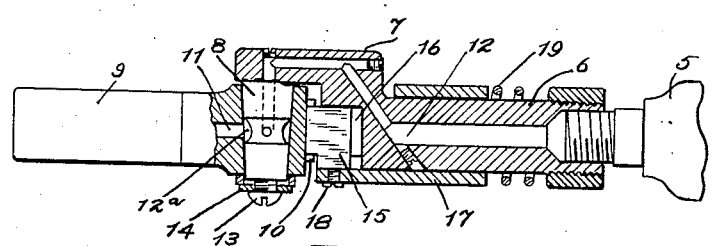
Fig. 2 is a central section of the nozzle of Fig. 1 with parts in elevation.

The discharge nozzle is connected to the pump part 5 and, in the form of the invention illustrated in Figs. 1 and 2, is shown as comprising a rigid conduit member 6, having an offset extension 7, provided with a plug 8 extending therefrom at a right angle. A nozzle member 9 is rotatably mounted on the plug 8 to form a swivel joint between the conduit and nozzle members and is provided with a lubricant passage 11 communicating at all times with a lubricant passage 12 through the conduit and the plug 8, as, for example, by the cooperating groove 12a in Fig. 2. The plug 8 may be tapered and ground to make a fluid-tight fit in the nozzle member and may be adjustably held in proper relation thereto by the screw 13 and washer 14.

The latch 15 is free to move axially of the fitting within the pocket 16, and is normally held in the pocket by a portion of the sleeve 17 to which it may be connected as by the screw 18. The sleeve 17 is freely slidable upon the member 6 and is preferably urged toward the nozzle 9 by a spring 19 which tends to yieldingly force the latch 15 against the toothed portion 10 of member 9. The latch 15 is so formed as to fill the space between any two teeth of the portion 10 and, therefore, the member 9 may be locked in any of a number of positions with respect to rotation about plug 8, it being obvious that the latch 15 may be caused to disengage the teeth by manipulation of the sleeve 17, which when released will be moved by spring 19 in the direction to cause the latch to engage the teeth and firmly lock the nozzle member 9 in the chosen position.

Figure 3:
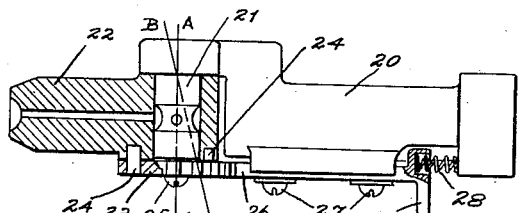
Fig. 3 is a central section of a modified form of nozzle with parts in elevation.
Figure 4:
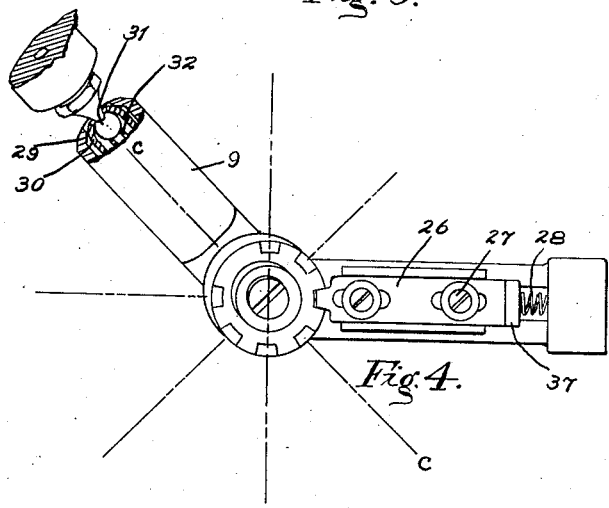
Fig. 4 is a view of a modified form of nozzle constructed according to the invention, illustrating its application to what might be an otherwise inaccessible fitting.

Fig. 3 illustrates a modified nozzle construction having a rigid conduit member 20 with a straight plug 21, at substantially right angles thereto, on which a nozzle member 22 is rotatably mounted. The nozzle member carries a toothed disc 23, which is held against rotation with respect thereto by pins 24. The disc 23 is held on the nozzle member 22 by a screw 25, which is screwed into the plug 21 and serves to hold the parts in assembled relation. A pawl 26 (another view of which is shown in Fig. 4) is slidably mounted on the conduit 20 by means of screws 27 passing through slots therein, and is adapted to engage the disc 23 to hold the nozzle and conduit against relative angular movement. With this construction, the plug is preferably ground to a very accurate fit, and the latch or pawl 26 may be pressed into engagement by means of the spring 28, and withdrawn by the extension or handle 37.

In the above described construction, the plugs 8 and 21 have been shown as at a right angle to the axis of the conduit member, that is, with their center lines, as shown at A—A of Fig. 3, normal to the axis of the conduit member; while, of course, it is plain that the plugs may be arranged at an indefinite number of other angles, if desired, as, for example, with their center lines as indicated at B—B in Fig. 3, and as also indicated by means of perspective in Fig. 4.

As shown in Fig. 4, the nozzle member or coupler 9 is constructed with inclined cam surfaces 29 at its outer end for directing clamp jaws 30 into engagement with a lubricant receiving nipple 31, shown as being of the type more particularly described and claimed in the patent to Morris, No. 1,962,254. The coupler 9 includes a sealing member 32, adapted for sealing engagement with the surface of the fitting head. The coupler, as shown, is constructed substantially in the same manner as the coupler described and claimed in the patent to Gannaway, No. 1,744,305; but it will be understood that any other clamp coupler or push-type nozzle construction might be employed.

The position of the nozzle member with its axis along the line C—C in Fig. 4, illustrates the nozzle member 8 at an angle of substantially 135 degrees to the conduit 6, and the other broken lines indicate locked positions of angular movement of the nozzle in either direction. Angular movements of the nozzles in planes other than approximately in the plane of the drawing sheet (in which the movements described may take place), may be obtained by rotation of the nozzle itself.

With the nozzle of the present invention, it will be clear that, where straight access to a fitting is prevented by some obstruction, the nozzle may be adjusted to a desired angular position for reaching the fitting while avoiding the obstruction. The locking feature is particularly important for use with lubricant dispensers of the push-type, such as illustrated in Fig. 1, since it permits a thrust to be exerted on the dispenser and against the fitting without causing undesired swiveling of the nozzle parts, and provides a rigid construction from end to end of the nozzle. The nozzle of the invention may also be used to advantage on the end of a flexible conduit to facilitate handling and to enable a fitting to be engaged around an obstruction where greater flexibility is necessary than that possessed by the conduit itself.

Figure 5:
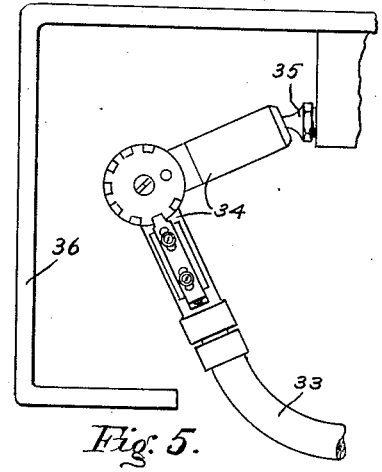
Fig. 5 is a more or less diagrammatic illustration of a manner in which the invention as applied to a whip-end hose may be used to reach a fitting that could not otherwise be reached.

Fig. 5 illustrates the use of the nozzle on a flexible conduit 33, which may be connected at one end to a source of lubricant under pressure and at the other end to an angularly adjustable discharge nozzle 34, constructed according to the invention. When it is desired to service a fitting, such as 35, access to which is obstructed by a machine part 36, the nozzle may be locked in the position indicated and the conduit bent, as shown. Without the use of the nozzle it will be apparent that the fitting could not be reached, since the conduit would not be capable of bending through the sharp angle required and, with a free swivel, it would be so difficult to handle the nozzle as to make engagement with the fitting extremely difficult, if not impossible, in the small space available.

While in Figs. 1, 2, 4 and 5, the nozzle members 9 are shown as of the "clamp on" type and, therefore, relatively long, it will be obvious that "push" type nozzles, such as shown, for example, in Fig. 3, may be used with any of the constructions indicated, and may be made even shorter than shown in Fig. 3, if desired, and that such shortening may add to the utility thereof in many cases.

While several embodiments of the invention have been shown and described in detail, it will be apparent that many changes might be made therein, and it is not intended that the scope of the invention shall be limited to the embodiments shown or otherwise than by the terms of the appended claims.

I claim:

1. A lubricant discharge nozzle comprising a rigid conduit member, a rigid nozzle member, means forming a swivel connection between said members for relative rotation about an axis at an angle to the conduit axis, there being communicating passages through said means and said members whereby the nozzle member is in communication with the conduit member at all times, a series of locking teeth carried by one of said members, and means carried by the other of said members for engaging said locking teeth to selectively lock said members in a plurality of angular positions about said swivel axis.

2. A lubricant discharge device comprising a rigid supply conduit, a rigid extension on said conduit extending on an angle therefrom, a discharge nozzle having a sleeve portion fitting over said extension and a body portion extending at an angle from said extension and including means to make a lubricant tight seal with a lubricant receiving fitting, a series of locking teeth on said sleeve portion and a pawl movably carried by said conduit substantially axially thereof for engagement with said locking teeth for selectively locking said discharge nozzle in any one of a plurality of radial positions about said extension.

JOHN L. CREVELING.